United States Patent

Sasaki

[11] Patent Number: 5,924,813
[45] Date of Patent: Jul. 20, 1999

[54] GASKET CLAMP STRUCTURE

[75] Inventor: Eiji Sasaki, Fuji, Japan

[73] Assignee: Jatco Corporation, Japan

[21] Appl. No.: 09/007,028

[22] Filed: Jan. 14, 1998

[30] Foreign Application Priority Data

Jan. 31, 1997 [JP] Japan ................................. 9-032723

[51] Int. Cl.⁶ ............................................. F16B 5/02
[52] U.S. Cl. ..................... 403/11; 403/288; 403/408.1;
74/606 R; 277/630
[58] Field of Search ..................... 403/11, 12, 288,
403/408.1, 404, 24; 411/82, 258, 930, 386,
437; 277/592, 598, 630, 652; 74/606 R

[56] References Cited

U.S. PATENT DOCUMENTS

| | | | |
|---|---|---|---|
| 3,405,591 | 10/1968 | Neuschotz | 403/288 X |
| 3,618,443 | 11/1971 | Fitzner | 277/630 X |
| 3,932,050 | 1/1976 | Yahraus | 403/408.1 X |
| 4,719,812 | 1/1988 | Machida et al. | 74/606 R X |
| 4,892,000 | 1/1990 | Renk et al. | 74/606 R X |
| 5,024,632 | 6/1991 | Cox et al. | 403/11 X |
| 5,220,854 | 6/1993 | Allart et al. | 74/606 R X |
| 5,536,108 | 7/1996 | Kvalheim | 403/231 X |
| 5,562,377 | 10/1996 | Giannuzzi et al. | 411/82 |
| 5,704,749 | 1/1998 | Landgrebe | 411/386 X |

FOREIGN PATENT DOCUMENTS 260191  10/1926  United Kingdom .................. 74/606 R Primary Examiner—Harry C. Kim
Attorney, Agent, or Firm—Rossi & Associates

[57] ABSTRACT

A gasket clamp structure is provided which includes a gasket clamping bolt having a male screw and a coating material that is applied to an outer circumferential surface of a distal end portion of the male screw, a retaining member having a mounting hole, a casing having a thread hole in which a female screw is formed, and a gasket interposed between the retaining member and the casing and having a mounting hole. The gasket clamping bolt is inserted and screwed into the thread hole of the casing through the mounting holes of the retaining member and gasket, so that the gasket is clamped between the casing and the retaining member. A recess is formed in an inlet portion of the thread hole of the casing such that the recess has an inside diameter that is larger than an outside diameter of a thread of the male screw of the gasket clamping bolt. The depth of the recess is determined such that the bolt-head side end of the portion to which the coating material is applied is located below the gasket and fully received in the recess, when the male screw is inserted into the recess and is brought into engagement with the female screw of the casing.

1 Claim, 4 Drawing Sheets

GASKET CLAMP STRUCTURE

BACKGROUND OF THE INVENTION

1. Field of the Invention

The present invention relates to a gasket clamp structure used for clamping a gasket between a casing and a retaining member in various apparatus, such as an automatic transmission system.

2. Description of the Prior Art

A known example of the above type of gasket clamp structure is illustrated in FIG. 3. This structure includes a gasket clamping bolt 30 having a male screw 31 and a coating material 32 that is applied to an outer circumferential surface of a distal end portion of the male screw 31, and retaining member 33 and gasket 34 having respective mounting holes 33a, 34a. The gasket clamping bolt 30 is passed through the mounting holes 33a, 34a of the retaining member 33 and gasket 34, and screwed into a thread hole 36 of a casing 35, so that the gasket 34 is clamped between the casing 35 and the retaining member 33.

In the known structure as described above, however, when the male screw 31 of the gasket clamping bolt 30 is brought into engagement with a female screw 36a formed in the thread hole 36, through the mounting holes 33a, 34a of the retaining member 33 and gasket 34, and screwed into the thread hole 36 so as to clamp the gasket 34, as shown in FIG. 3, the radially inner face of the mounting hole 34a of the gasket 34a engages with thread grooves of the male screw 31 of the bolt 30, and scrapes the coating material 32 off the thread grooves, as shown in FIG. 4. At the same time, the female screw 36a of the casing 35 scrapes the coating material 32 at around the opening or inlet of the thread hole 36. As a result, scrapings or flakes 32A of the coating material 32 are deposited on the opposite major surfaces (seal surfaces) of the gasket 34, as shown in FIG. 4, and consequently the gasket 34 may not be able to provide a sufficient seal, thus causing leakage of oil or the air.

SUMMARY OF THE INVENTION

It is therefore an object of the present invention to provide a gasket clamp structure wherein a gasket can provide a sufficient seal so as to prevent leakage of oil or the air with high reliability.

To accomplish the above object, there is provided a gasket clamp structure comprising a gasket clamping bolt having a male screw and a coating material that is applied to an outer circumferential surface of a distal end portion of the male screw, a retaining member having a mounting hole, a casing having a thread hole in which a female screw is formed, and a gasket interposed between the retaining member and the casing and having a mounting hole, the gasket clamping bolt being inserted and screwed into the thread hole of the casing through the mounting holes of the retaining member and gasket, so that the gasket is clamped between the casing and the retaining member, wherein a recess is formed in an inlet portion of the thread hole of the casing, the recess having an inside diameter that is larger than an outside diameter of a thread of the male screw of the gasket clamping bolt, and wherein the recess has a depth that is determined such that the bolt-head side end of the portion of the male screw to which portion the coating material is applied is located below the gasket and fully received in the recess, when the male screw is inserted into the recess and is brought into engagement with the female screw of the casing.

When the gasket clamping bolt is brought into engagement with the female screw of the thread hole of the casing, through the mounting holes of the retaining member and gasket, the bolt-head side end of the portion that is coated with the coating material is located below the gasket, namely, between the gasket and the bottom wall of the recess formed in the thread hole. In this arrangement, when the male screw of the gasket clamping bolt is screwed into the female screw in the thread hole so as to clamp the gasket, the radially inner face of the mounting hole of the gasket does not scrape the coating material on the bolt even if this inner face engages or contacts with thread grooves of the male screw.

Furthermore, the recess formed in the opening end or inlet portion of the thread hole of the casing has an inside diameter that is larger than the outside diameter of the thread of the male screw of the bolt. When the gasket clamping bolt is screwed into the thread hole, therefore, scrapings of flakes of the coating material, which are produced when the female screw scrapes the coating material at around the bottom end of the recess, are deposited in the bottom portion of the recess. Thus, the scrapings of the coating material are not deposited on the opposite major surfaces (seal surfaces) of the gasket. Accordingly, the gasket can surely provide a sufficient seal, to thus prevent leakage of oil and the air with high reliability.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENT

A preferred embodiment of the present invention will be described in detail.

Figure 1:
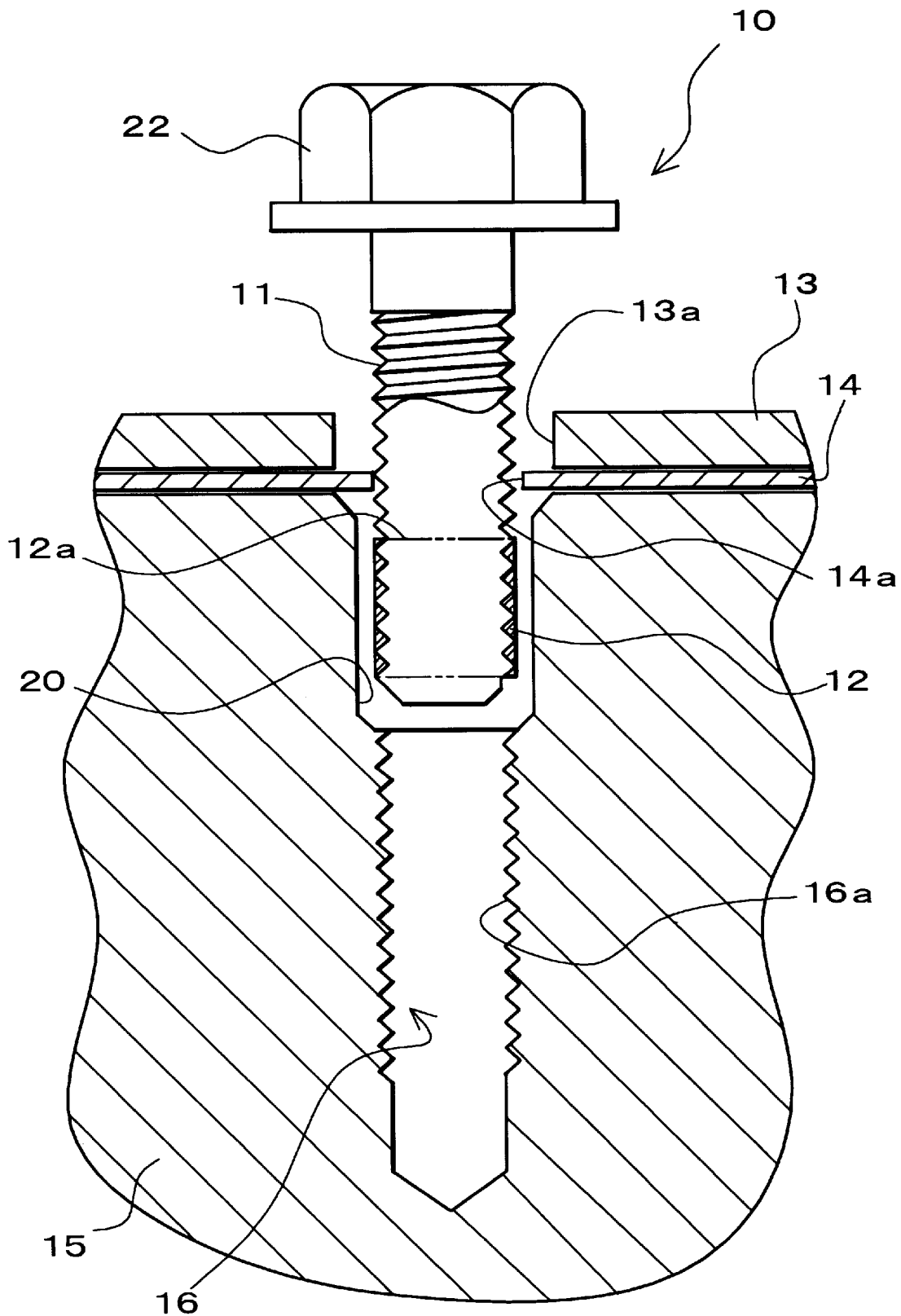
FIG 1 is a vertical cross sectional view showing a gasket clamp structure according to one embodiment of the present invention.
Figure 2:
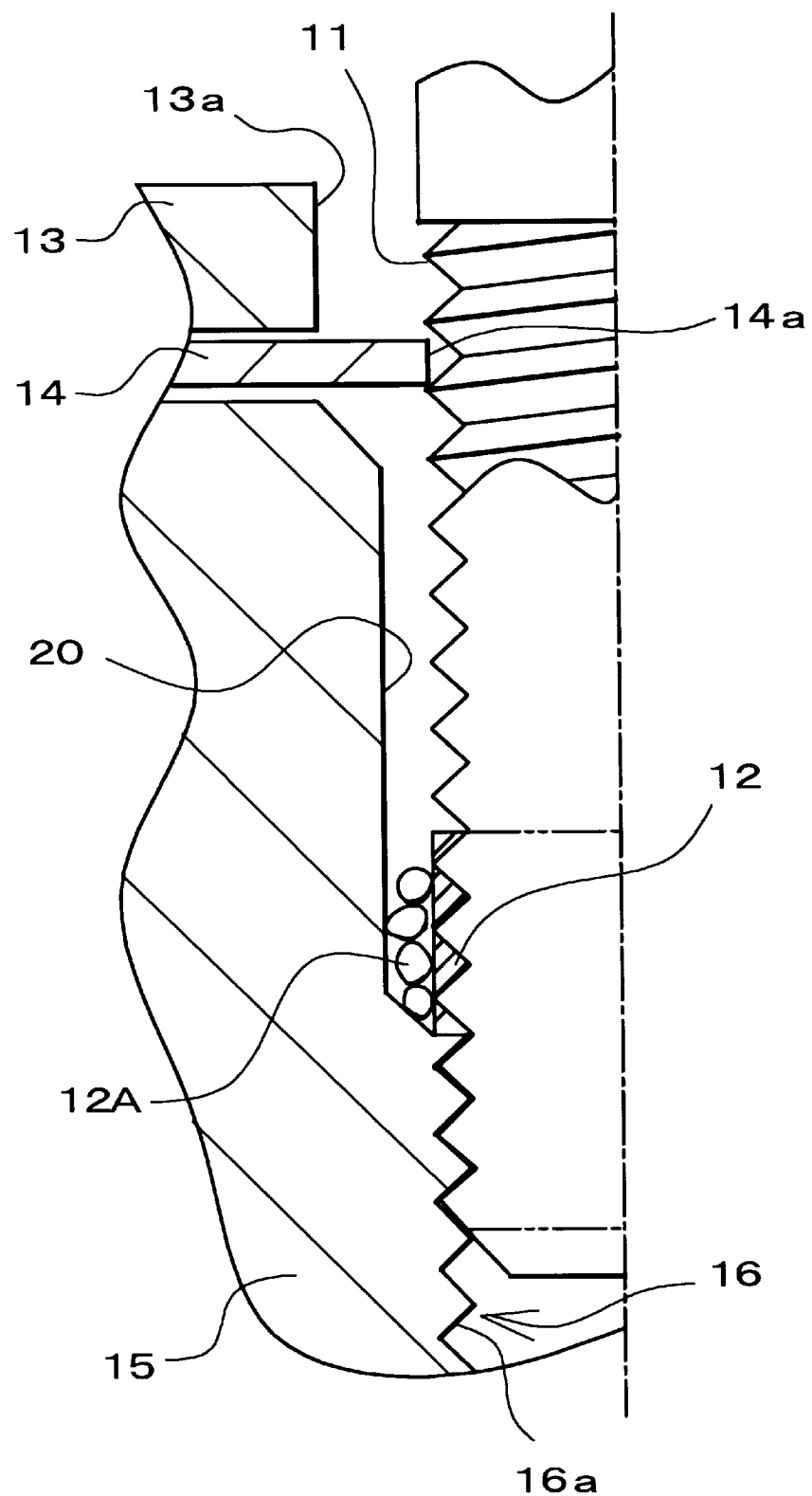
FIG. 2 is a vertical cross sectional view showing in enlargement an engaging portion of the gasket clamp structure of FIG. 1, wherein a male screw of a bolt is screwed into a thread hole of a casing.
Figure 3:
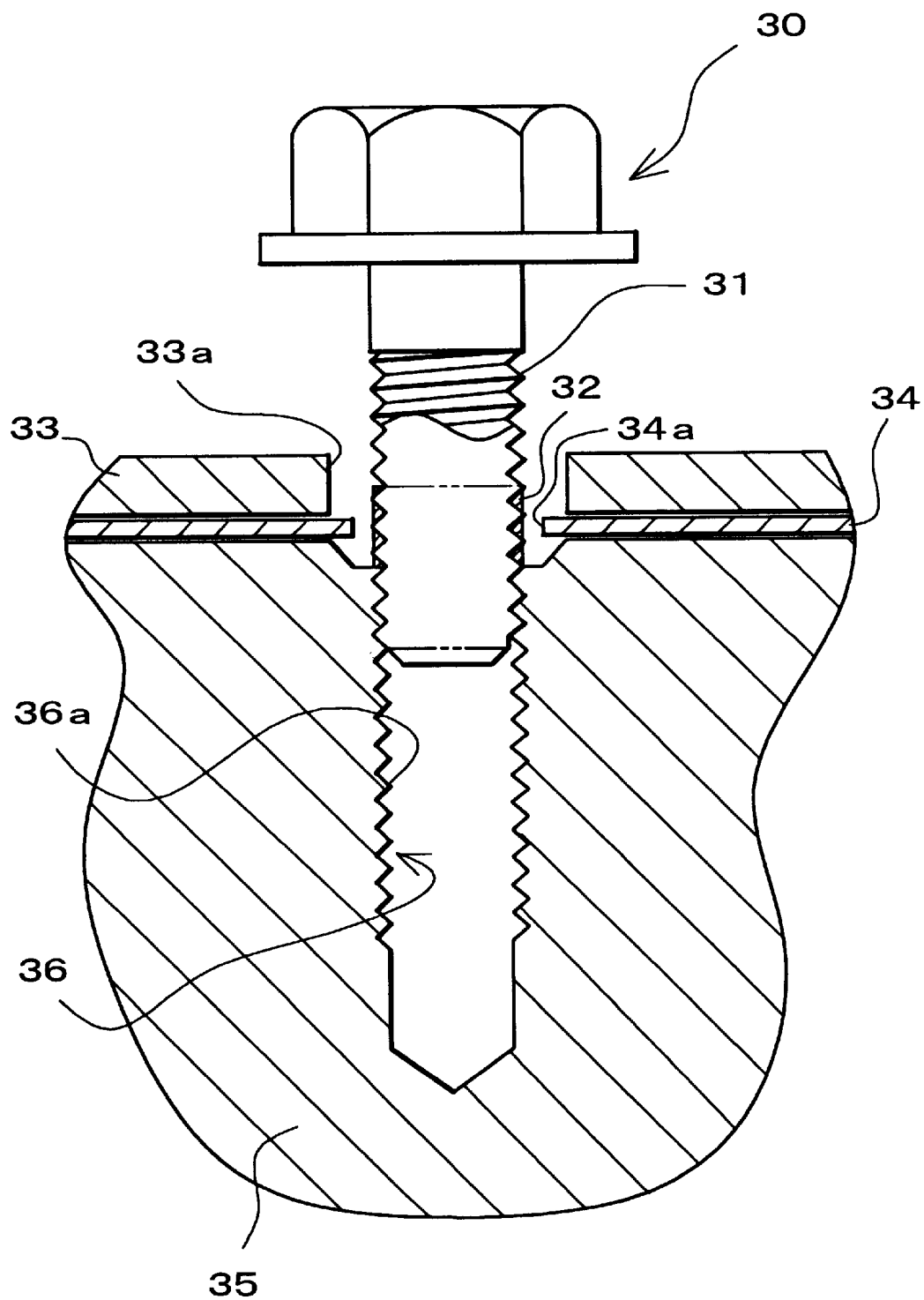
FIG. 3 is a vertical cross sectional view showing a known gasket clamp structure.
Figure 4:
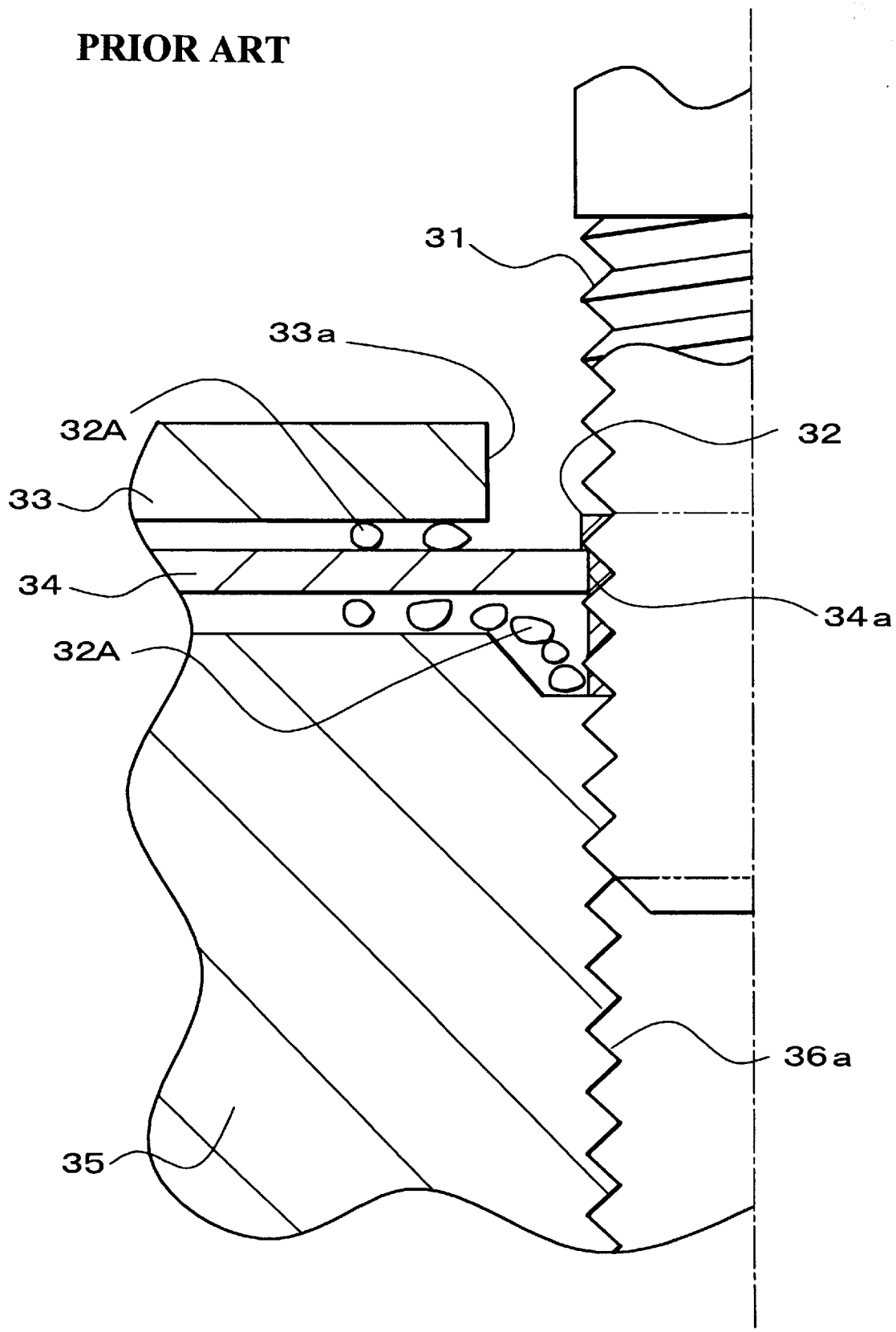
FIG. 4 is a vertical cross sectional view showing in enlargement an engaging portion of the structure of FIG. 3, in which a male screw of a bolt is screwed into a thread hole of a casing.

FIG. 1 is a vertical cross sectional view showing a gasket clamp structure constructed according to one embodiment of the present invention, and FIG. 2 is a cross sectional view showing in enlargement an engaging portion of the structure of FIG. 1, wherein a male screw of a bolt is held in engagement with a thread hole of a casing.

As shown in FIG. 1, the gasket clamp structure includes a gasket clamp bolt (hereinafter simply called "bolt") 10 having a head 22, a male screw 11 and a coating material 12 that is applied to an outer circumferential surface of a distal end portion of the male screw 11. The male screw 11 of the bolt 10 is screwed into a thread hole 16 of a casing 15 (for example, transmission case of an automatic transmission system), through respective mounting holes 13a, 14a of a retaining member 13 and a gasket 14, so that the gasket 14 is clamped between the outer surface of the casing 15 and the inner surface of the retaining member 13.

A recess or escape hole 20 whose inside diameter is larger than the outside diameter of the thread of the male screw 11 of the bolt 10 is formed at an inlet or opening end portion of the thread hole 16 of the casing 15. The position of the bolt-head side end 12a of the portion of the bolt to which portion the coating material 12 is applied and the depth of the recess 20 are set such that the bolt-head side end 12a of the coated portion is fully received in the recess 20, namely, located on the side of the bottom wall of the recess 20 with respect to the gasket 14, when the male screw 11 is brought into engagement with the female screw 16a formed in the thread hole 16 of the casing 15. Namely, when the male screw 11 is about to engage with the female screw 16a as shown in FIG. 1, it the bolt head portion 12a that is coated with the coating material 12 is located below the gasket 14.

In the gasket clamp structure of the present embodiment constructed as described above, when the bolt 10 is brought into engagement with the female screw 16a of the thread hole 16 of the casing 15, through the respective mounting holes 13a and 14a of the retaining member 13 and gasket 14, the bolt-head side end 12a of the portion coated with the coating material 12 is fully received in the recess 20, namely located below the gasket 14. When the male screw 11 of the bolt 10 is screwed into the thread hole 16 of the casing 15 so as to clamp the gasket 14, therefore, the radially inner face of the mounting hole 14a of the gasket 14 does not scrape the coating material 12 even if this inner face engages with thread grooves of the male screw 11.

Furthermore, the inside diameter of the recess 20 formed in the inlet portion of the thread hole 16 of the casing 15 is larger than the outside diameter of the thread of the male screw 11 of the bolt 10. Therefore, scrapings or flakes 12A of the coating material 12, which are produced when the female screw 16a scrapes the coating material 12 upon engagement of the bolt 10 with the female screw 16, are deposited in the recess 20, as shown in FIG. 2. Thus, the scrapings 12A of the coating material 12 are not deposited on the opposite surfaces (seal surfaces) of the gasket 14 as in the known structure. Accordingly, in the present embodiment, the gasket 14 can provide a sufficient seal, and prevent leakage of oil or the air with high reliability.

What is claimed is:

1. A gasket clamp structure comprising:

a gasket clamping bolt having a male screw and a coating material that is applied to an outer circumferential surface of a distal end portion of the male screw;

a retaining member having a first mounting hole;

a casing having a thread hole in which a female screw is formed; and a gasket interposed between said retaining member and said casing and having a second mounting hole, said gasket clamping bolt being inserted and screwed into the thread hole of said casing through said first mounting hole of said retaining member and said second mounting hole of said gasket, so that said gasket is clamped between said casing and said retaining member, wherein a recess is formed in an inlet portion of the thread hole of said casing, said recess having an inside diameter that is larger than an outside diameter of a thread of said male screw of said gasket clamping bolt, and wherein said recess has a depth that is determined such that a bolt-head side end of the portion to which said coating material is applied is located below said gasket and fully received in said recess, when said male screw is inserted into said recess and is brought into engagement with said female screw of said casing.

* * * * *